United States Patent
Kim

(10) Patent No.: US 12,092,260 B2
(45) Date of Patent: Sep. 17, 2024

(54) MOUNTING BRACKET ASSEMBLY FOR RADAR DEVICE

(71) Applicant: HL KLEMOVE CORP., Incheon (KR)

(72) Inventor: Young Ju Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 0 days.

(21) Appl. No.: 18/091,262

(22) Filed: Dec. 29, 2022

(65) Prior Publication Data

US 2023/0213143 A1  Jul. 6, 2023

(30) Foreign Application Priority Data

Jan. 5, 2022 (KR) .................. 10-2022-0001696

(51) Int. Cl.
*F16M 13/02* (2006.01)

(52) U.S. Cl.
CPC .................... *F16M 13/02* (2013.01)

(58) Field of Classification Search
CPC ........................................................ F16M 13/02
See application file for complete search history.

(56) References Cited

U.S. PATENT DOCUMENTS

| | | | | |
|---|---|---|---|---|
| 4,097,012 A * | 6/1978 | McIntyre | ............ | B60R 11/0205 224/570 |
| 5,003,436 A * | 3/1991 | Yamada | ............... | B60Q 1/0683 362/420 |
| 5,580,204 A * | 12/1996 | Hultman | ................. | F16B 5/065 24/297 |
| 5,707,133 A * | 1/1998 | Burton | ...................... | F16C 1/16 362/267 |
| 6,345,905 B1 * | 2/2002 | Kibayashi | .............. | B60Q 1/076 362/465 |
| 9,038,876 B2 * | 5/2015 | Aleem | ...................... | B60R 9/06 224/555 |
| 9,279,437 B2 * | 3/2016 | Gold | ...................... | F16B 5/0216 |
| 9,346,414 B1 * | 5/2016 | Kuhens | ............... | B60R 11/0258 |
| 9,914,419 B2 * | 3/2018 | Fath | ...................... | H01Q 1/3233 |
| 10,167,996 B2 * | 1/2019 | Cox | ........................ | F16M 11/18 |
| 11,621,478 B2 * | 4/2023 | Kim | .................... | H01Q 1/3291 342/70 |
| 2015/0069193 A1 * | 3/2015 | Meinel | ................. | H01Q 1/3233 248/188.4 |
| 2015/0250072 A1 * | 9/2015 | Ichikawa | ........... | H01R 13/5213 439/587 |
| 2017/0324155 A1 * | 11/2017 | Styles | .................. | G01S 7/4026 |
| 2018/0301795 A1 * | 10/2018 | Lopez, Jr. | ............ | H01Q 1/3283 |

(Continued)

FOREIGN PATENT DOCUMENTS

| KR | 10-2015-0099954 | 9/2015 |
|---|---|---|
| KR | 10-2017-0112762 | 10/2017 |

OTHER PUBLICATIONS

Office Action dated Mar. 11, 2024 for Korean Patent Application No. 10-2022-0001696 and its English translation from Global Dossier.

*Primary Examiner* — Monica E Millner

(74) *Attorney, Agent, or Firm* — Womble Bond Dickinson (US) LLP

(57) ABSTRACT

According to the present embodiments, it is possible to achieve cost savings and a simplified assembly process by reducing components and enhanced quality by mitigating the tolerance during assembly, as well as better stability and accuracy during angle adjustment.

14 Claims, 6 Drawing Sheets

(56) References Cited

U.S. PATENT DOCUMENTS

| | | | |
|---|---|---|---|
| 2020/0011990 A1* | 1/2020 | Yu | H01Q 1/42 |
| 2022/0196831 A1* | 6/2022 | Hong | B60R 11/00 |
| 2023/0202569 A1* | 6/2023 | Kovie | E05C 17/006 |
| | | | 280/164.1 |

* cited by examiner

MOUNTING BRACKET ASSEMBLY FOR RADAR DEVICE

CROSS-REFERENCE TO RELATED APPLICATION

This application claims priority from Korean Patent Application No. 10-2022-0001696, filed on Jan. 5, 2022, which is hereby incorporated by reference for all purposes as if fully set forth herein.

BACKGROUND

Field

The present embodiments relate to a radar device mounting bracket assembly and, more specifically, to a radar device mounting bracket assembly that may achieve cost savings and a simplified assembly process by reducing components and enhanced quality by mitigating the tolerance during assembly, as well as better stability and accuracy during angle adjustment.

Description of Related Art

A vehicle comes equipped with an electronic control unit (ECU) for electronically controlling various devices and receives information from sensors or switches installed therein/thereon and processes the information to perform control functions for enhancing the stability and steering feeling.

In particular, the vehicle has radar devices for recognizing the surrounding objects, gathering information, such as the distance from the vehicle, relative velocity, or direction, and processing the information for the electronic control unit to be able to perform an anti-collision function or accident avoidance function by recognizing the distance between the vehicle and the surrounding object. The radar device needs to be mounted in a correct position to be able to precisely recognize the distance to the surrounding object.

However, an error is unavoidable during manufacture, assembly, or mounting of the radar device to the vehicle. A conventional way to address the error is to correct the direction of the radar device by adjusting the angle of the radar device after mounting the radar device on a mounting bracket.

However, too many components are conventionally used to adjust the angle of the radar device, leading to a cost rise and complicated assembly. Further, errors are accumulated during assembly, causing excessive friction during angle adjustment and reducing the range of adjustment, with the result of a high defect rate.

BRIEF SUMMARY

The present embodiments have been conceived in the foregoing background and relate to a radar device mounting bracket assembly that may achieve cost savings and a simplified assembly process by reducing components and enhanced quality by mitigating the tolerance during assembly, as well as better stability and accuracy during angle adjustment.

According to the present embodiments, there may be provided a radar device mounting bracket assembly comprising a first bracket fixed to a vehicle body and including a first coupling portion and a second coupling portion coupled to a radar device and provided on a front surface thereof, a second bracket including a third coupling portion coupled to the radar device and coupled to the first bracket to be movable forward or backward of the first bracket, and an adjustment member coupled to the first bracket and the second bracket to move the second bracket relative to the first bracket.

According to the present embodiments, it is possible to achieve cost savings and a simplified assembly process by reducing components and enhanced quality by mitigating the tolerance during assembly, as well as better stability and accuracy during angle adjustment.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
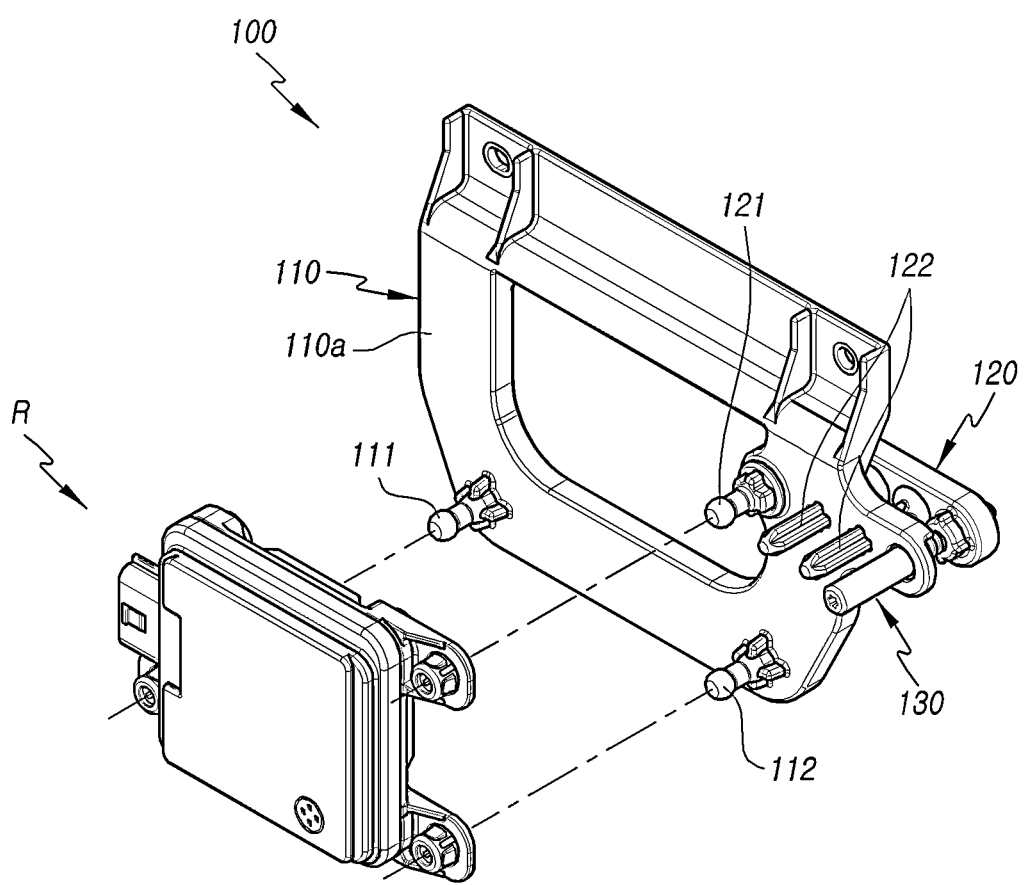
FIG. 1 is a perspective view illustrating a radar device and a radar device mounting bracket assembly according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
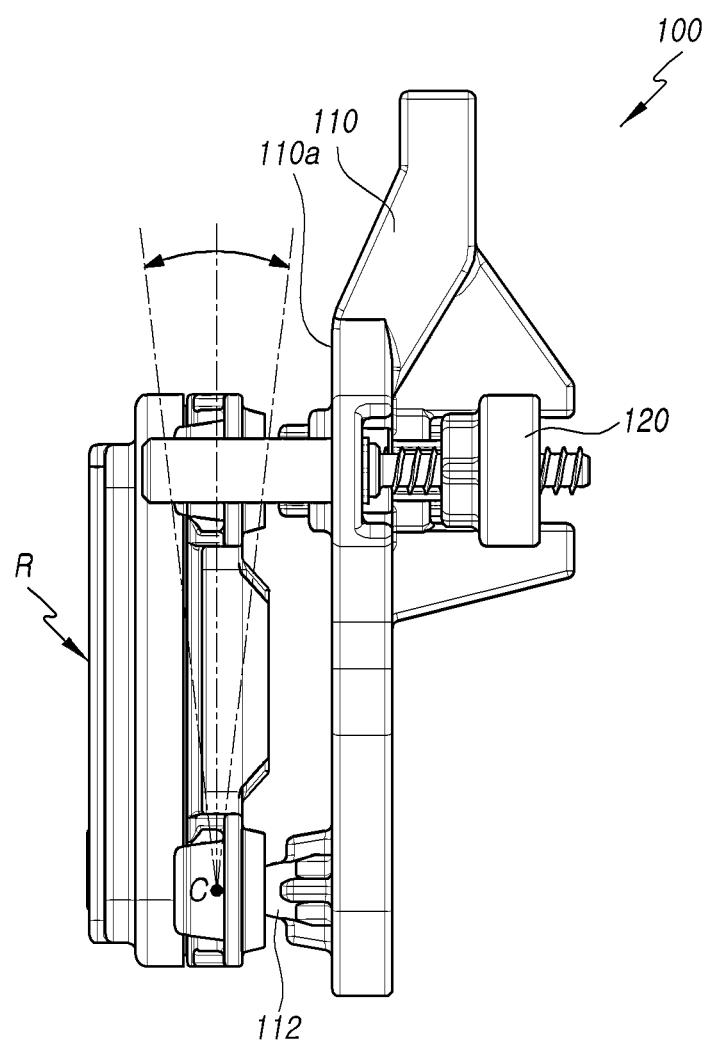
FIG. 2 is a side view of the combined state of FIG. 1.
Figure 3:
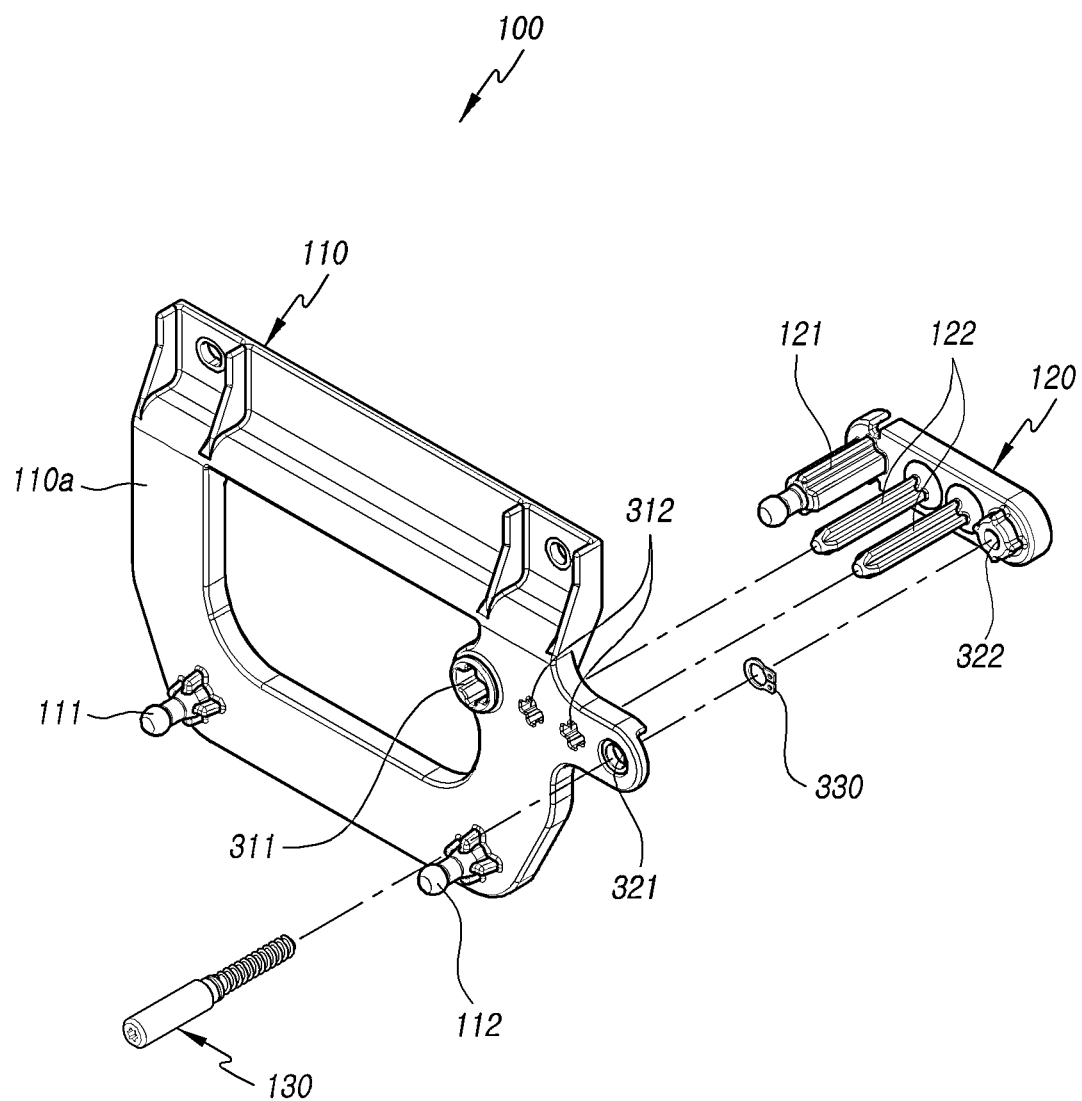
FIG. 3 is an exploded perspective view illustrating a radar device mounting bracket assembly according to the present embodiments.
Figure 4:
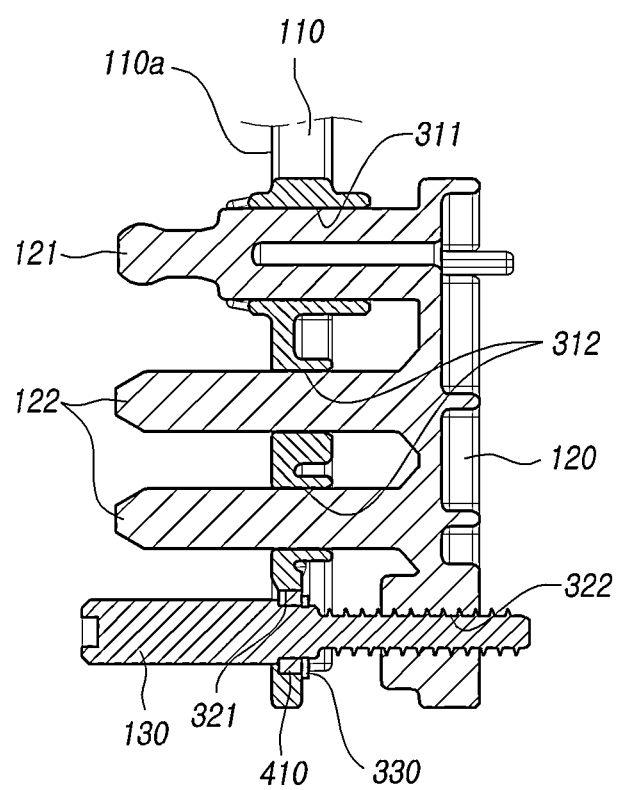
FIG. 4 is a cross-sectional view illustrating a radar device mounting bracket assembly according to the present embodiments.
Figure 5:
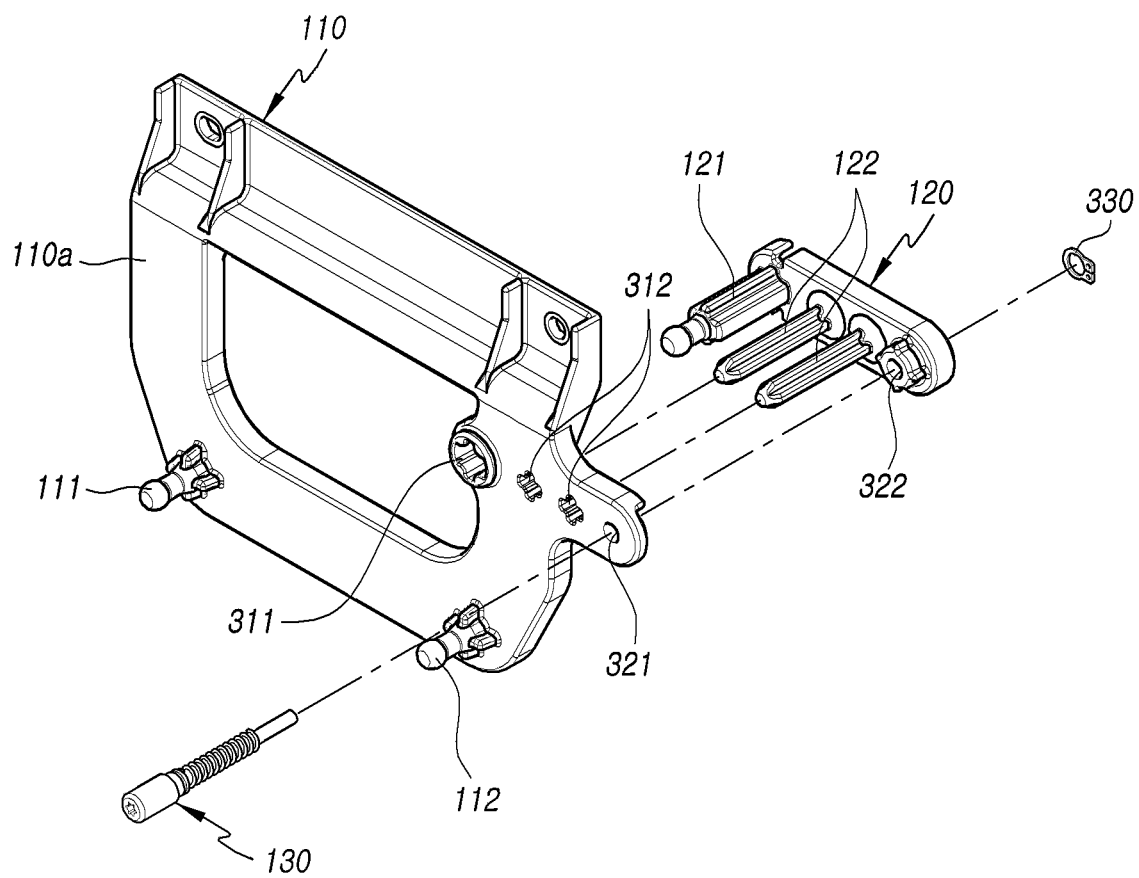
FIG. 5 is an exploded perspective view illustrating a radar device mounting bracket assembly according to the present embodiments.
Figure 6:
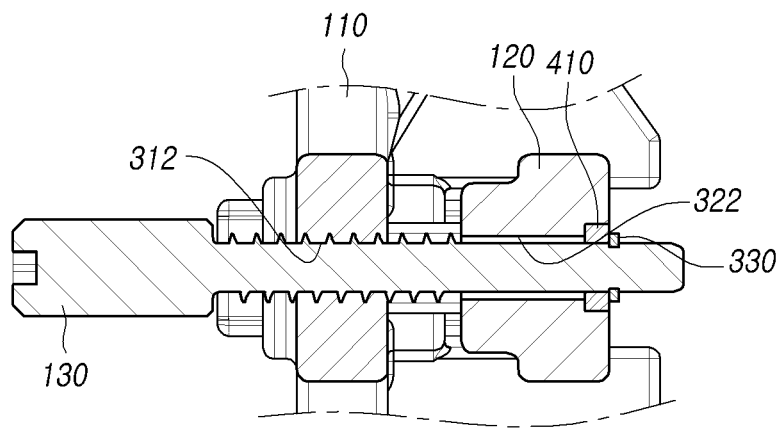
FIG. 6 is a cross-sectional view illustrating a radar device mounting bracket assembly according to the present embodiments.

FIG. 1 is a perspective view illustrating a radar device and a radar device mounting bracket assembly according to the present embodiments. FIG. 2 is a side view of the combined state of FIG. 1. FIG. 3 is an exploded perspective view illustrating a radar device mounting bracket assembly according to the present embodiments. FIG. 4 is a cross-sectional view illustrating a radar device mounting bracket assembly according to the present embodiments. FIG. 5 is an exploded perspective view illustrating a radar device mounting bracket assembly according to the present embodiments. FIG. 6 is a cross-sectional view illustrating a radar device mounting bracket assembly according to the present embodiments.

According to the present embodiments, a radar device mounting bracket assembly 100 comprises a first bracket 110 fixed to a vehicle body and including a first coupling portion 111 and a second coupling portion 112 coupled to a radar device R and provided on a front surface 110a thereof, a second bracket 120 including a third coupling portion 121 coupled to the radar device R and coupled to the first bracket 110 to be movable forward or backward of the first bracket 110, and an adjustment member 130 coupled to the first bracket 110 and the second bracket 120 to move the second bracket 120 relative to the first bracket 110.

A description is made below with reference to FIG. 1. The radar device R is coupled to the vehicle body by the radar device mounting bracket assembly 100 according to the present embodiments. The first bracket 110 is coupled to and fixed to the frame of the vehicle body. After the radar device R is coupled to the radar device mounting bracket assembly 100 according to the present embodiments, the angle of the radar device R may be adjusted by manipulating the adjustment member 130.

The first bracket 110 may include a first coupling portion 111 and a second coupling portion 112. The second bracket 120 is provided with a third coupling portion 121. The radar device R is coupled to the first coupling portion 111 to the third coupling portion 121. The first coupling portion 111 and the second coupling portion 112 may protrude from the front surface 110a of the first bracket 110, and the third coupling portion 121 may protrude from the second bracket 120 beyond the front surface 110a of the first bracket 110.

The second bracket 120 is coupled to the first bracket 110 to be movable forward and backward of the first bracket 110. Therefore, as the second bracket 120 moves forward or backward with respect to the first bracket 110, the height of the third coupling portion 121, protruding from the front surface 110a of the first bracket 110, increases or decreases.

The movement of the second bracket 120 relative to the first bracket 110 may be performed by manipulating the adjustment member 130. In other words, the angle of the radar device R may be adjusted by manipulating the adjustment member 130 after mounting the radar device R on the radar device mounting bracket assembly 100 according to the present embodiments. According to the present embodiments, it is possible to adjust the angle of the radar device with such a simplified configuration, making it possible to reduce components, save raw and manufacturing costs, and simplify assembly as compared with the conventional art. It is also possible to reduce errors during assembly to enhance quality and attain better accuracy and stability during angle adjustment.

According to an embodiment, the first coupling portion 111, the second coupling portion 112, and the third coupling portion 121 are coupled to the radar device R via ball joints so that the angle of the radar device R may be adjusted by the second bracket 120 which is moved forward or backward of the first bracket by manipulating the adjustment member 130. For example, as shown in the drawings, the ends of the first coupling portion 111, the second coupling portion 112, and the third coupling portion 121 have ball studs, and the radar device R may have sockets formed to receive the ball studs. The ball studs may be inserted into the sockets so that the radar device R may be coupled to the first coupling portion 111, the second coupling portion 112, and the third coupling portion 121. Accordingly, as shown in FIG. 2, as the second bracket 120 moves forward or backward (left or right side in the drawings), the radar device R may be inclined forward or backward of the straight line (see reference character C) which connects the end of the first coupling portion 111 and the end of the second coupling portion 112.

The structure of the radar device mounting bracket assembly 100 according to the present embodiments is described below in greater detail with reference to FIG. 3. According to an embodiment, the first bracket 110 may have a first through hole 311 passing through the first bracket 110 in front and rear directions, and the third coupling portion 121 may be inserted into the first through hole 311 and protrude forward of the first bracket 110. Accordingly, the third coupling portion 131 may protrude beyond the front surface 110a of the first bracket 110 through the first through hole 311.

Further, according to an embodiment, the first bracket 110 may have a second through hole 312 passing through the first bracket 110 in front and rear directions, and the second bracket 120 may have a protruding guide 122 that is inserted into the second through hole 312 and supported by the first bracket 110. As the guide 122 is inserted into the second through hole 312 and supported by the first bracket 110, the movement of the second bracket 120 relative to the first bracket 110 may be stably performed.

In other words, as shown in the drawings, the second bracket 120 may include a base portion and be shaped so that the third coupling portion 121 and the guide 122 protrude forward from the base portion. The third coupling portion 121 and the guide 122 formed on the base portion are inserted into a first coupling hole 321 and a second through hole 312. The guide 122 may be inserted into the second through hole 312 to support movement of the second bracket 120 relative to the first bracket 110 and, as the second bracket 120 moves, the angle of the radar device R coupled with the third coupling portion 121 is adjusted.

Further, according to an embodiment, as shown in the drawings, a pair of second through holes 312 and a plurality of guides 122 may be provided. For example, external impact may apply torque to the second bracket 120, with the guide 122 serving as the center axis, when the second bracket 120 moves. If only one second through hole 312 and only one guide 122 are provided, it maybe difficult to cancel out the torque. Further, the second bracket may be vibrated, causing the radar device R to be shifted from its set position. To address such issue, the first through hole 311, the second through hole 312, the third coupling portion 121, and the guide 122 may be shaped as a cross, and a plurality of second through holes 312 and a plurality of guides 122 may be provided to thereby effectively cancel out the torque applied to the second bracket 120. It is also possible to stably support movement of the second bracket 120 by the guide 122.

The adjustment member 130 for moving the second bracket 120 relative to the first bracket 110 is described below. According to an embodiment, the adjustment member 130 may be screwed to either the first bracket 110 or the second bracket 120 while being coupled to the other to be rotatable but axially fixed. Accordingly, as the adjustment member 130 is rotated, either the first bracket 110 or the second bracket 120 is moved in the axial direction of the adjustment member 130 along the thread, but the other is axially fixed, so that the second bracket 120 may be moved relative to the first bracket 110. The user may adjust the angle of the radar device R by coupling the radar device R to the radar device mounting bracket assembly 100 according to the present embodiments and fitting a tool to the adjustment member 130 to rotate it.

According to an embodiment, the first bracket 110 may have the first coupling hole 321, the second bracket 120 may have the second coupling hole 322, and the adjustment member 130 maybe inserted into the first coupling hole 321 and the second coupling hole 322. The adjustment member 130 maybe rotated while being inserted in the first coupling hole 321 and the second coupling hole 322 and be screwed to either the first bracket 110 or the second bracket 120 while being coupled to the other to be rotatable but axially fixed.

According to an embodiment, as shown in FIGS. 3 and 4, the adjustment member 130 may be axially fixed with respect to the first bracket 110 and be screwed with the second bracket 120. Therefore, when rotated, the adjustment member 130 is axially fixed along with the first bracket 110 while only the second bracket 120 is moved forward or backward.

Further, rotation of the adjustment member 130 about the first bracket 110 may be supported by a bushing 410. For example, the first bracket 110 may be formed of plastic, and the adjustment member 130 may be formed of steel. To reduce friction and wear due to rotation of the adjustment member 130, the bushing 410 may be provided between the adjustment member 130 and the first bracket 110.

Further, a fixing member 330, axially supported by the first bracket 110, may be coupled to the adjustment member 130 to axially fix the adjustment member 130 with respect to the first bracket 110. The fixing member 330 may be, e.g., a snap ring.

According to an embodiment, as shown in FIGS. 5 and 6, the adjustment member 130 may be screwed with the first bracket 110 and be axially fixed with respect to the second bracket 120. Accordingly, when the adjustment member 130 is rotated, the adjustment member 130, along with the second bracket 120, may be moved forward or backward while the first bracket 110 is fixed.

Likewise, rotation of the adjustment member 130 about the second bracket 120 may be supported by the bushing 410. For example, friction and wear between the second bracket 120, which is formed of plastic, and the adjustment member 130, which is formed of steel, may be reduced by the bushing 410.

Further, a fixing member 330, axially supported by the second bracket 120, may be coupled to the adjustment member 130 to axially fix the adjustment member 130 with respect to the second bracket 120. The fixing member 330 may be, e.g., a snap ring.

By the so-shaped radar device mounting bracket assembly, it is possible to achieve cost savings and a simplified assembly process by reducing components and enhanced quality by mitigating the tolerance during assembly, as well as better stability and accuracy during angle adjustment.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A radar device mounting bracket assembly, comprising:
a first bracket fixed to a vehicle body and including a first coupling portion and a second coupling portion directly coupled to a radar device and provided on a front surface of the first bracket;
a second bracket including a third coupling portion directly coupled to the radar device and coupled to the first bracket to be movable forward or backward with respect to the first bracket; and
an adjustment member coupled to the first bracket and the second bracket to move the second bracket relative to the first bracket.

2. The radar device mounting bracket assembly of claim 1, wherein the first coupling portion, the second coupling portion, and the third coupling portion are coupled to the radar device via a ball joint.

3. The radar device mounting bracket assembly of claim 1, wherein the first bracket has a first through hole passing through the first bracket in front and rear directions, and wherein the third coupling portion is inserted into the first through hole and protrudes forward of the first bracket.

4. The radar device mounting bracket assembly of claim 1, wherein the first bracket has a second through hole passing through the first bracket in front and rear directions, and wherein the second bracket has a protruding guide inserted into the second through hole and supported by the first bracket.

5. The radar device mounting bracket assembly of claim 4, wherein a pair of second through holes and a pair of guides are provided.

6. The radar device mounting bracket assembly of claim 1, wherein the first bracket has a first coupling hole, and the second bracket has a second coupling hole, and wherein the adjustment member is inserted into the first coupling hole and the second coupling hole.

7. The radar device mounting bracket assembly of claim 6, wherein the adjustment member is axially fixed with respect to the first bracket and is screwed with the second bracket.

8. The radar device mounting bracket assembly of claim 7, wherein a fixing member axially supported by the first bracket is coupled to the adjustment member.

9. The radar device mounting bracket assembly of claim 6, wherein the adjustment member is screwed with the first bracket and axially fixed with respect to the second bracket.

10. The radar device mounting bracket assembly of claim 9, wherein a fixing member axially supported by the second bracket is coupled to the adjustment member.

11. The radar device mounting bracket assembly of claim 8, wherein the fixing member is a snap ring.

12. The radar device mounting bracket assembly of claim 10, wherein the fixing member is a snap ring.

13. The radar device mounting bracket assembly of claim 1, wherein the first bracket fixed to the vehicle body and including the first and second coupling portions coupled to the radar device is disposed between the radar device and the second bracket including the third coupling portion coupled to the radar device and coupled to the first bracket.

14. The radar device mounting bracket assembly of claim 1, wherein the radar device to which the first, second, and third coupling portions are coupled is configured to recognize objects around a vehicle.

\* \* \* \* \*